(12) United States Patent
Tsuchiya et al.

(10) Patent No.: US 6,817,120 B2
(45) Date of Patent: Nov. 16, 2004

(54) DEPOSIT DISCHARGE SYSTEM AND METHOD OF DISCHARGING DEPOSIT

(75) Inventors: Yoshiaki Tsuchiya, Nagano (JP); Yorikuni Shibuya, Iida (JP)

(73) Assignees: Japan as represented by Director General of Shinshu University, Nagano (JP); Yoshikawa Kensetu Kabushiki Kaisha, Nagano (JP)

( * ) Notice: Subject to any disclaimer, the term of this patent is extended or adjusted under 35 U.S.C. 154(b) by 0 days.

(21) Appl. No.: 10/104,031

(22) Filed: Mar. 25, 2002

(65) Prior Publication Data

US 2002/0146286 A1 Oct. 10, 2002

Related U.S. Application Data

(63) Continuation of application No. PCT/JP00/06860, filed on Oct. 2, 2000.

(51) Int. Cl.[7] ................................................. E02F 3/88
(52) U.S. Cl. ......................................................... 37/324
(58) Field of Search ....................... 405/73, 74; 37/195, 37/317, 324, 334, 335

(56) References Cited

U.S. PATENT DOCUMENTS 4,264,105 A * 4/1981 Thompson ................... 405/74
4,386,473 A * 6/1983 Amann et al. ................ 37/319
4,945,661 A * 8/1990 Kuioka et al. ................ 37/195

FOREIGN PATENT DOCUMENTS

| JP | 62-7427 | 1/1987 |
|---|---|---|
| JP | 64-14435 A | 1/1989 |
| JP | 1-315514 A | 12/1989 |
| JP | 11-324008 A | 11/1999 |
| WO | 98/20208 | 5/1998 |

* cited by examiner

*Primary Examiner*—Michael Safavi
(74) *Attorney, Agent, or Firm*—Birch, Stewart, Kolasch & Birch, LLP

(57) ABSTRACT

A deposit discharge system comprises: a discharge tube having a suction port opened so as to face a water bottom face of a water storing place on which deposits are deposited, a straight tube part extending upward from the suction port, and a discharge port communicating with the straight tube part and opened on the downstream side of the water storing place for draining the deposits together with water stream; a crane device suspending a whole main tube part of the discharge tube positioned in the water storing place in a state of being submerged and having a vertical moving mechanism vertically moving the suction port; and an air valve provided in the discharge tube for controlling introduction and exhaust of air from the discharge tube by opening and closing operation, wherein the discharge tube is installed so as to pass, when the deposits are discharged, through a dam banking in the water storing place routing a position lower than a water level of the water storing place.

9 Claims, 11 Drawing Sheets

DEPOSIT DISCHARGE SYSTEM AND METHOD OF DISCHARGING DEPOSIT

CROSS-REFERENCE TO RELATED APPLICATIONS

The present nonprovisional application claims priority under 35 USC 119 to Japanese Patent Application No. 11-350476 filed on Dec. 9, 1999 and under 35 U.S.C. §120 to PCT/JP00/06860 filed on Oct. 2, 2000 the entire contents thereof are hereby incorporated by reference.

BACKGROUND OF THE INVENTION

1. Field of the Invention

The present invention relates to a deposit discharge system and a method of discharging deposit from a water storing place, e.g., dam.

2. Description of Background Art

In a water storing places such as a dam, functions of the dam are lost when pondage of the dam is, reduced. To maintain the functions, deposits in water, e.g., sands and stones, are dredged so as to maintain enough water level. Stones included in the deposits dredged are used as aggregates of concrete, and others are used for reclamation, etc.

However, if the dam is dredged, no stones and sands are conveyed downstream. Therefore, the natural balance is lost and new environmental problems are occurred. For example, organic components made in mountains stored by the dam; no nourishment or foods of plankton are supplied to the sea, so that number of fish is reduced. Further, no stones and sands are conveyed downstream, so that a riverbed is extremely washed out and sandy beaches are disappeared.

In a huge dam, water flows little and stays there for a long time. Unlike a small dam, stones and sands are apt to precipitate and deposit therein. Almost all fine grains in water are also deposited. For example, about 10,000,000 m3 of fine grains have been deposited for 40 years. It is very difficult for a dredging boat to remove a huge amount of stones and sands, so it is also difficult to maintain effective pondage of dams.

As shown in FIG. S, a system for discharging deposits 22 from a huge dam 60 was proposed. The system directly flows flood flow and solid-liquid two-phase flow from the upstream side of the dam to the downstream side 64 via a bypass tunnel 30. A plurality of supplementary tunnels 32, which communicate a water storing place 20 to the bypass tunnel 30, are formed in a coast 23 of the dam. With this structure, deposits can be discharged from a plurality of positions in the water storing place 20.

Deposit discharging ports 62 of the supplementary tunnels 32 are opened in a bank of the dam so as to safely flow the deposits 22. Water gates for opening and closing the discharging ports 62 and a mechanism for securely actuating the water gates are required. If the discharging ports 62 are not securely closed, water stored on the upstream side of the supplementary tunnels 32 will be leaked out therefrom.

However, it is difficult to securely open and close the water gates when a large amount of water including deposits flows. Even if the water gates are opened and closed, the open-close mechanism must be large. To discharge stones and sands deposited thicker than prescribed thickness, height of the water gates must be equal to or higher than the thickness of the deposits. The water gates must bear up against high water pressure, so that they must have large structures.

The deposits 22 must be uniformly removed from a large area of the water bottom so as to maintain proper pondage.

However, in the case of discharging the deposits to the bypass tunnel 30 via the water gates and the supplementary tunnels 32, the deposits near the water gates can be effectively discharged, but other deposits cannot be discharged effectively. Therefore, the deposits 22 distributed in the large area cannot be fully removed.

To solve this problem, a siphonal discharge system shown in FIG. 12 was proposed.

A discharge tube 70 has a suction port 71 opened so as to face the water bottom face 29 of the water storing place 20 and a discharge port 78 opened in a water path 80 located on the downstream side. A tube part 73 of the discharge tube 70, which is located on the suction port side, is supported by a boat 82; a mid part 76 is bent and routed above the water level 21 so as to get over the dam banking 25.

The discharge tube 70 is filled with water by a high power pump 84 installed in the water, so that the siphonage can be occurred. When the siphonal action is stopped, an air valve 77, which is provided to a top of the mid part 76, which is bent, of the discharge tube 70, is opened so as to introduce air into the discharge tube 70.

A straight tube part 72, which is close to the suction port 71 of the discharge tube 70, is vertically arranged. The straight tube part 72 can be extended and contracted according to a distance between the water surface 21 to the water bottom 29. For example, it is formed by an inner tube and an outer tube, which can be vertically extended and retracted with respect to the inner tube.

The discharge tube 70 has a bendable section 74. The suction port 71 of the discharge tube 70 can be turned, in a horizontal plane, about the bendable section 74. To horizontally turn the suction port 71, the boat supporting the part of the tube on the suction port 71 side is moved. By moving the boat, the suction port 71 can be moved along a circular track. A float 75 makes the discharge tube 70 stay on the water surface.

TECHNICAL PROBLEMS

In the above described conventional system, the discharge tube 70 is installed to get over the dam banking 25. With this structure, the discharge by siphonal action is limited. If speed of solid-liquid two-phase flow is equal to or lower than prescribed speed, solids begin to precipitate. For example, if volume percentage of solids is 1%, the speed is about 2.5 mlsec. At this speed, deposits close the tube. To solve this problem, the conventional system employs the high power source, e.g., the pump 84, so as to add jet flow. Namely, the high power source maintains a filled water channel in the discharge tube 70. Note that, the word "filled water channel" means a channel filled with water and having no free water surface.

The conventional deposit discharge system must have the high power source, e.g., the pump 84. Therefore, the structure must be complex, and the siphonal structure is not essential. With this complex structure, initial cost and running cost of the discharge system must be increased.

Since the discharge tube 70 gets over the dam banking, the mid part of the discharge tube 70 must be bent upward. The discharge tube 70 must be bent at three points at least, so that friction loss in the tube must be greater. Deposits, which must be passed through the discharge tube 70, are deposited in and closes the tube.

Further, the discharge tube 70 cannot be made longer due to the friction loss therein.

SUMMARY AND OBJECTS OF THE INVENTION

An object of the present invention is to provide a deposit discharge system having a simple structure and capable of easily and efficiently discharging deposits.

Another object of the present invention is to provide a deposit discharge system in which no deposits close the tube and which is capable of efficiently discharging deposits.

Further, another object of the present invention is to provide a method of efficiently discharging deposits with the deposit discharging system.

To achieve the objects, the present invention has following structure.

The deposit discharge system comprises: a discharge tube having a suction port opened so as to face a water bottom face of a water storing place on which deposits are deposited, a straight tube part vertically extending upward from the suction port, and a discharge port opened in a water path on the downstream side of the water storing place for draining the deposits from the water storing place to the water path together with water stream, characterized in: that the discharge tube is pierced through a bank hole, which is located below the water level of the water storing place, and suspended by a boat, which floats on the water, so as to locate the discharge tube under the water level of the water storing place; and that the discharge tube is vertically moved by an elevating unit, which is provided to the boat, so as to move the suction port close to and away from the water bottom face of the water storing place with prescribed cycle, whereby pulsating flow and plug flow, in which high solid-concentrated part and low solid-concentrated part are alternately appeared, are generated.

In the deposit discharging system of the present invention, the pulsating flow and the plug flow can be actively generated in the vertical tube part by vertically moving the vertical tube part; further a centripetal motion of turbulent flow in the vertical tube part can be accelerated, so that the deposits deposited in the water storing place can be efficiently discharged, as the solid-liquid two-phase flow, and without friction loss, which is caused by colliding solids with an inner face of the tube. In the deposit discharge system, the boat may suspend and locate the discharge tube under a hydraulic gradient line.

In the deposit discharge system, an air valve, which is capable of introducing air to and discharging air from the discharge tube, may be provided to the discharge tube so as to generate and stop siphonage caused by waterhead difference. With this structure, generating and stopping the siphonage can be easily and properly controlled.

In the deposit discharge system, the elevating unit may have means for adjusting the cycle of the vertical movement of the suction port. With this structure, generation of the pulsating flow and the plug flow and volume concentration of solids in the solid-liquid two-phase flow can be easily adjusted, so closing the tube can be prevented by the simple structure and simple operation, further the solid-liquid two-phase flow can be efficiently discharged.

The deposit discharge system may further comprise: an arm member having one end, which is pivotably connected to an end of the straight tube part near the suction port, and the other end, which is capable of turning upward and downward; a fulcrum member pivotably connected to a mid part of the arm member and capable of pivoting with respect to the arm member with maintaining a vertical posture in the vertical direction in the water; and a chisel pivotably connected to the one end of the arm member and capable of maintaining a vertical posture in the water, the chisel agitating the deposits on the water bottom face, wherein power transmitting member, e.g., a wire, of the elevating unit is connected to the chisel. With this structure, the chisel agitates the deposits, so that the deposits can be further efficiently discharged.

In the deposit discharge system, a mid part of the discharge tube other than the vertical tube part may be capable of bending in a horizontal plane. With this structure, the deposits in a broad area can be discharged.

In the deposit discharge system, a straight part of the discharged tube may be pierced through the bank hole formed in a dam banking and capable of moving, in the bank hole, in the longitudinal direction thereof, and a plurality of roller-shaped supporting members, which assist smooth movement of the discharge tube, may be provided near the bank hole. With this structure, the deposits in a broad area can be discharged without reducing the discharging efficiency.

In the deposit discharge system, a space between the bank hole and the discharge tube may be water-tightly sealed by a sealing member, which is formed like an air bag and capable of pressing when air is introduced therein. With this structure, the discharge tube can be moved and the space can be easily and securely sealed.

The method of the present invention is executed in a deposit discharge system including: a discharge tube having a suction port opened so as to face a water bottom face of a water storing place on which deposits are deposited, a straight tube part vertically extending upward from the suction port, and a discharge port opened in a water path on the downstream side of the water storing place for draining the deposits from the water storing place to the water path together with water stream, the method comprises the steps of: piercing the discharge tube through a bank hole, which is located below the water level of the water storing place; suspending the discharge tube by a boat, which floats on the water, so as to locate the discharge tube under the water level of the water storing place; and vertically moving the discharge tube by an elevating unit, which is provided to the boat, so as to move the suction port close to and away from the water bottom face of the water storing place with prescribed cycle, whereby pulsating flow and plug flow, in which high solid-concentrated part and low solid-concentrated part are alternately appeared, are generated.

In the method, the down movement of the suction port is free fall so as to effectively get effects of the pulsating flow, the plug flow, and the ground effect, which is occurred when an open end of a tube is rapidly moved close to a bottom face and which is capable of concentrically generating swirl and rising flow in the tube. By this method, the deposits can be efficiently discharged. By vertically moving the suction port, effects caused by the plug flow and the- pulsating flow, which are occurred by the vertical movement, and ground effect can be employed. Experimental results are shown in FIG. 11. Namely, the discharging efficiency of the method was 4.8 times as much as that of a conventional method.

Further, in the method, the elevating unit of the boat may suspend the discharge tube in a state, in which a part of the discharge tube on the suction port side other than the vertical tube part is located above the bank hole and the part of the discharge tube is located at the highest position thereof, whereby the discharge tube can be inclined with down gradient so as not stay deposits in the tube. With this method, the discharge tube can be properly arranged under the hydraulic gradient line, so that the deposits can be efficiently discharged without closing the tube.

Further scope of applicability of the present invention will become apparent from the detailed description given hereinafter. However, it should be understood that the detailed description and specific examples; while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
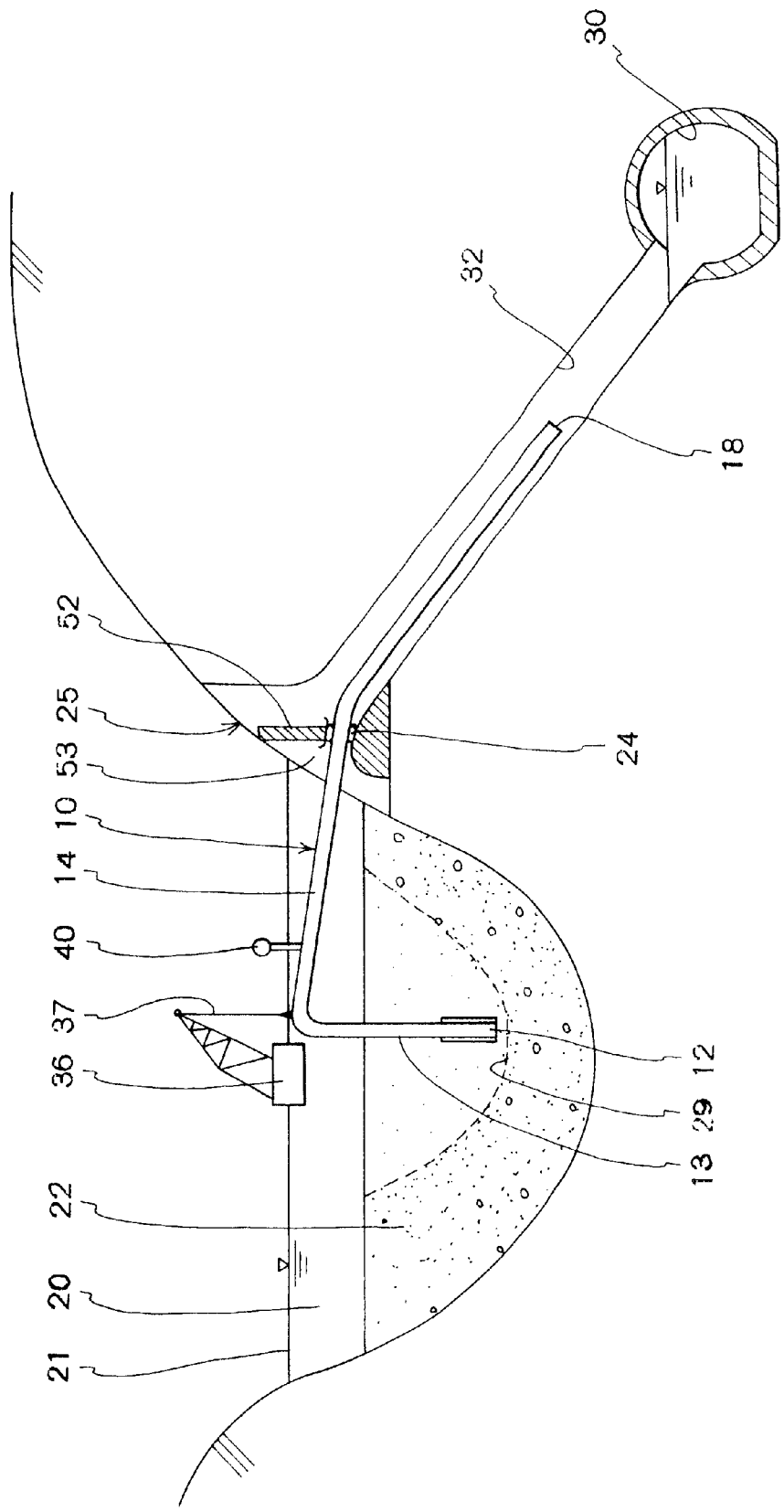
FIG. 1 is a sectional view of an embodiment of the deposit discharge system of the present invention.

Preferred embodiments of the present invention will now be described in detail with reference to the accompanying drawings. FIG. 1 is a sectional view of an embodiment of the deposit discharge system of the present invention, which discharges deposits from a dam, etc Namely, the deposit discharge system is installed in a huge dam.

A discharge tube 10 comprises: a suction port 12; a straight tube part 13; a main tube part 14; and a discharge port 18. The suction port 12 is opened so as to face a water bottom face 29 of a water storing place, i.e., a dam, on which deposits 22, e.g., stones and sands, are deposited. The straight tube part 13 is vertically extended from the suction port 12. The discharge port 18 is communicated to a bypass tunnel 30, which acts as a water path and which is located on the downstream side of the water storing place 20. The main tube part 14 communicates the straight tube part 13 to the discharge port 18. The discharge tube 10 employs functions of waterhead, the filled water channel and siphon so as to drain the deposits 22, form the water storing place 20 to the bypass tunnel 30, together with water.

Figure 5:
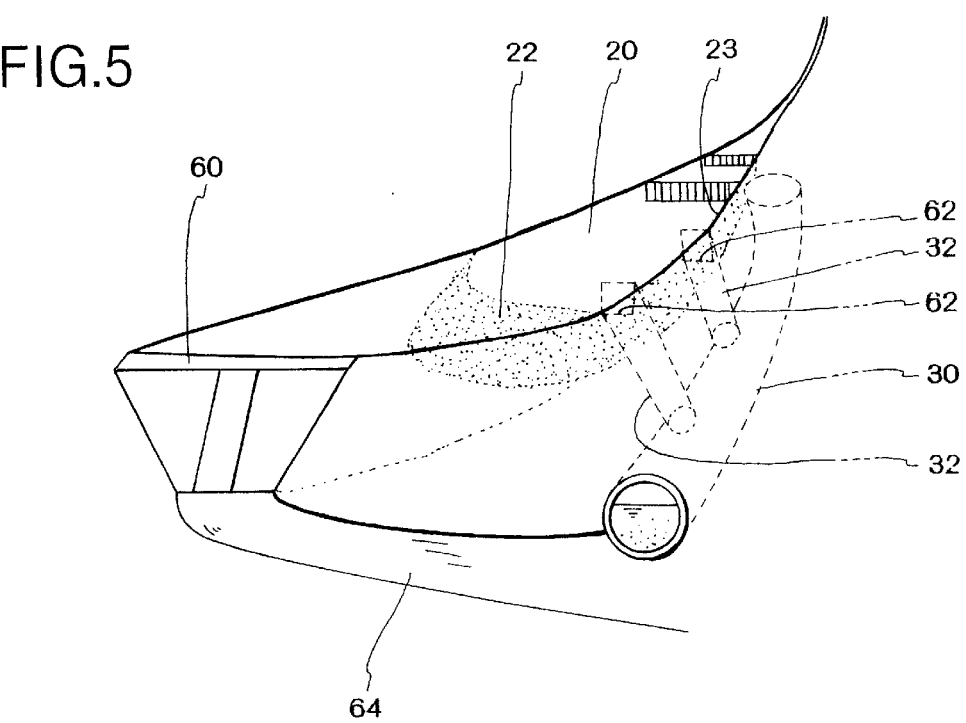
FIG. 5 is a perspective view of a bypass tunnel of a huge dam.

As shown in FIG. 5, the bypass tunnel 30 is provided to discharge the deposits from the huge dam.

A fixed part of the discharge tube 10 is pierced through a bank hole 24 communicated to a supplementary tunnel 32. The discharge port 18 of the discharge tube 10 is located at a lower part of the supplementary tunnel 32 so as to get enough waterhead.

At least one supplementary tunnel 32 is communicated to the bypass tunnel 30. With this structure, the deposits 22 in the water storing place 20 can be effectively discharged.

In the case of discharging muddy flow (solid-liquid two-phase flow) including small stones, whose average volume percentage is 8%, preferable waterhead from water level 21 of the water storing place 20 is 5 m or more.

Figure 2:
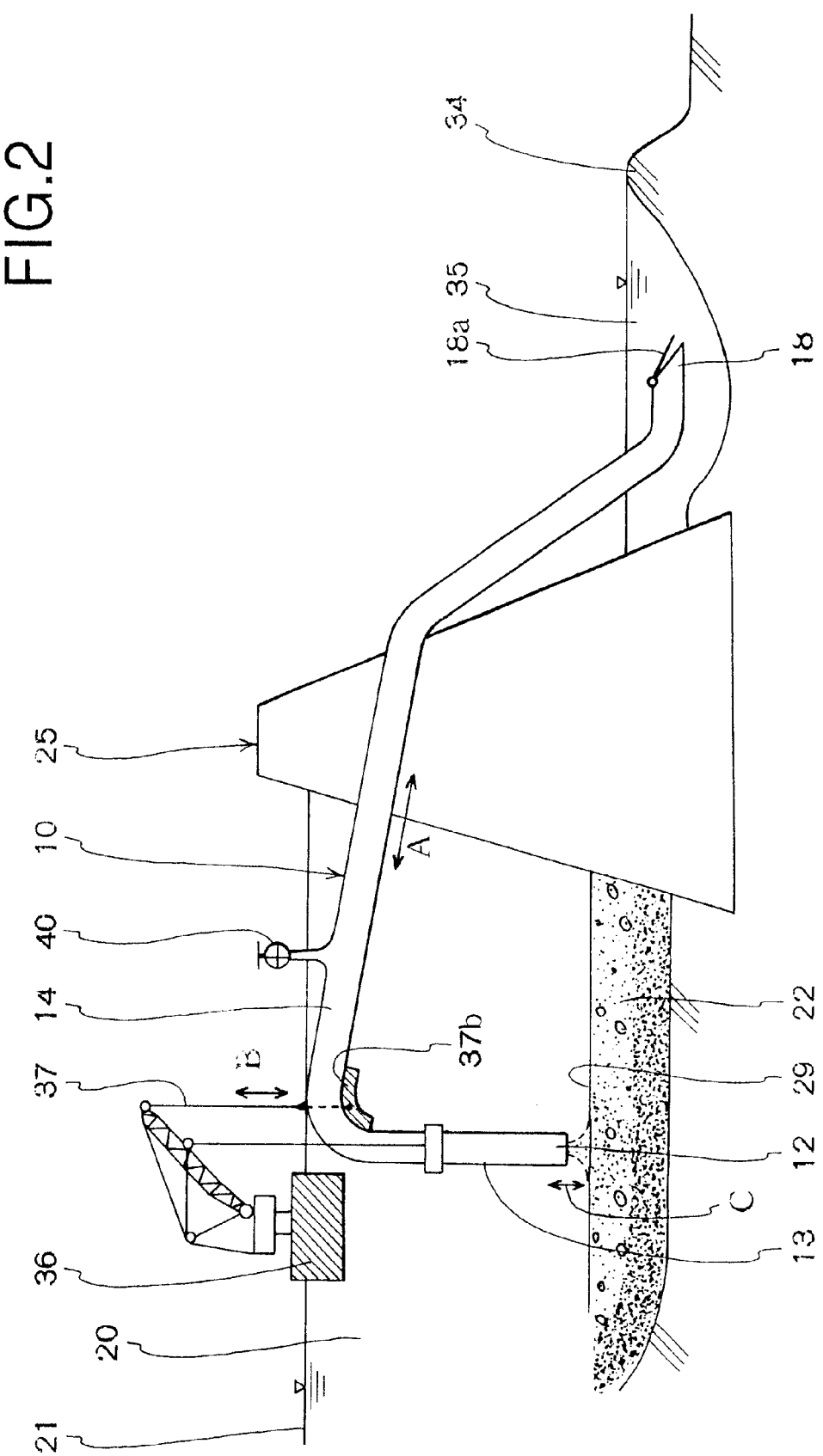
FIG. 2 is a sectional view of another place in which the system shown in FIG. 1 is installed.

In the case that no solids in the solid-liquid two-phase flow contact the inner face of the discharge tube 10 and the friction loss in the tube is not increased, speed of turbulent flow will be 3.8 m/sec. or more. Therefore, the discharge tube 10 is arranged so as to make the waterhead 5 m or more; the preferable speed is 3.8 m/sec. or more even if loss of waterhead is considered. Note that, the total water had is defined on the basis of the average volume percentage, the length of the discharge tube 10, the loss of waterhead at bent sections, etc For example, the end part including the discharge port 18 is submerged so as to get the effects of the filled water channel and the siphonage, and the end part is bent as shown so as to prevent air from entering from the discharge port 18. In FIG. 2, a lower banking 34 is formed on the downstream side of the dam banking so as to securely submerge the discharge port 18. Water in the lower banking 34 acts as a water cushion 35 and effectively continues pulsating flow from the tube with a valve 18a of the discharge port 18. If air enters the tube from the discharge port 18, the air proceeds to an upper part of the tube, so that the filled water channel is disappeared; namely, the solid-liquid two-phase flow flows in the open water channel. By forming the open water channel, water depth in the tube is made shallow, the solids in the flow contact the inner face of the tube, the friction loss in the tube is made greater, and the flow cannot continuously flow in the tube. To maintain the filled water channel and continuously flow in the tube, the discharge port 18 should be submerged as described above.

Parts of the discharge tube other than the end part including the discharge port 18 are not bent like the end part, so as not to deposit sands and stones therein. As far as the tube is bent like an arch, solids are flown, by gravity, together with water, so that solids can be properly discharged and no solids are deposited in the tube.

When the deposits 22 are discharged through the discharge tube 10, the discharge tube 10 is provided under the water level 21, so a bank hole 24 is formed in the dam banking 25.

By forming the bank hole 24, the discharged tube 10 can be routed positions under the water level 21 when at least the deposits 22 are discharged. With this structure, the discharge tube 10 can be routed below a hydraulic gradient line, and energy of waterhead can be properly used. Further, the filled water channel can be easily formed in the discharge tube 10.

Figure 3:
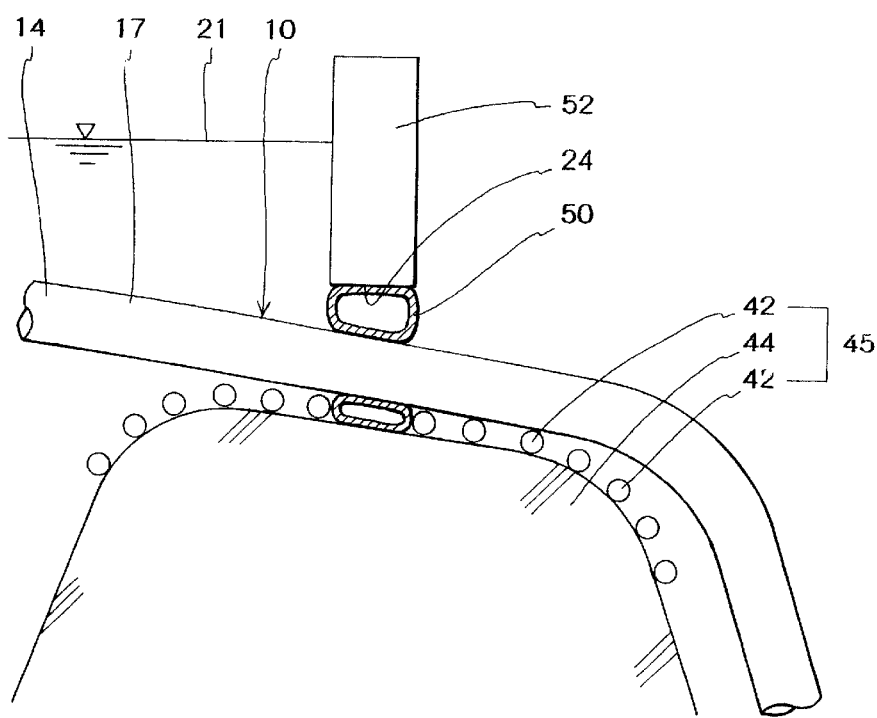
FIG. 3 is a sectional view showing a manner of fixing a discharge pipe of the system shown in FIG. 1.

Note that, means for water-tightly sealing a space between the bank hole 24 and the discharge tube 10 will be explained later with reference to FIG. 3. A crane boat 36, which acts as the crane device, is capable of suspending the whole main tube part 14 under the water level 21 of the water storing place 20.

The crane is used so as to submerged the whole main tube part 14 on the suction port 12 side. The main tube part 14 may be pulled upward in states other than stopping the siphonage. A part of the main tube part 14, e.g., an upper half, may be projected above the water surface 21. Namely, the main tube part 14 on the suction port 12 side need not be always submerged. The reasons will be explained. Firstly, the siphonage can be achieved even if the main tube part 14 on the suction port side is not perfectly submerged while the system is operated; discharging efficiency is made lower, but the muddy flow can be maintained. In the case that difference between the water level 21 and the level of the discharge port 18 is great, the main tube part 14 should be routed above the water surface so as to actively reduce the amount of discharging water.

Figure 10:
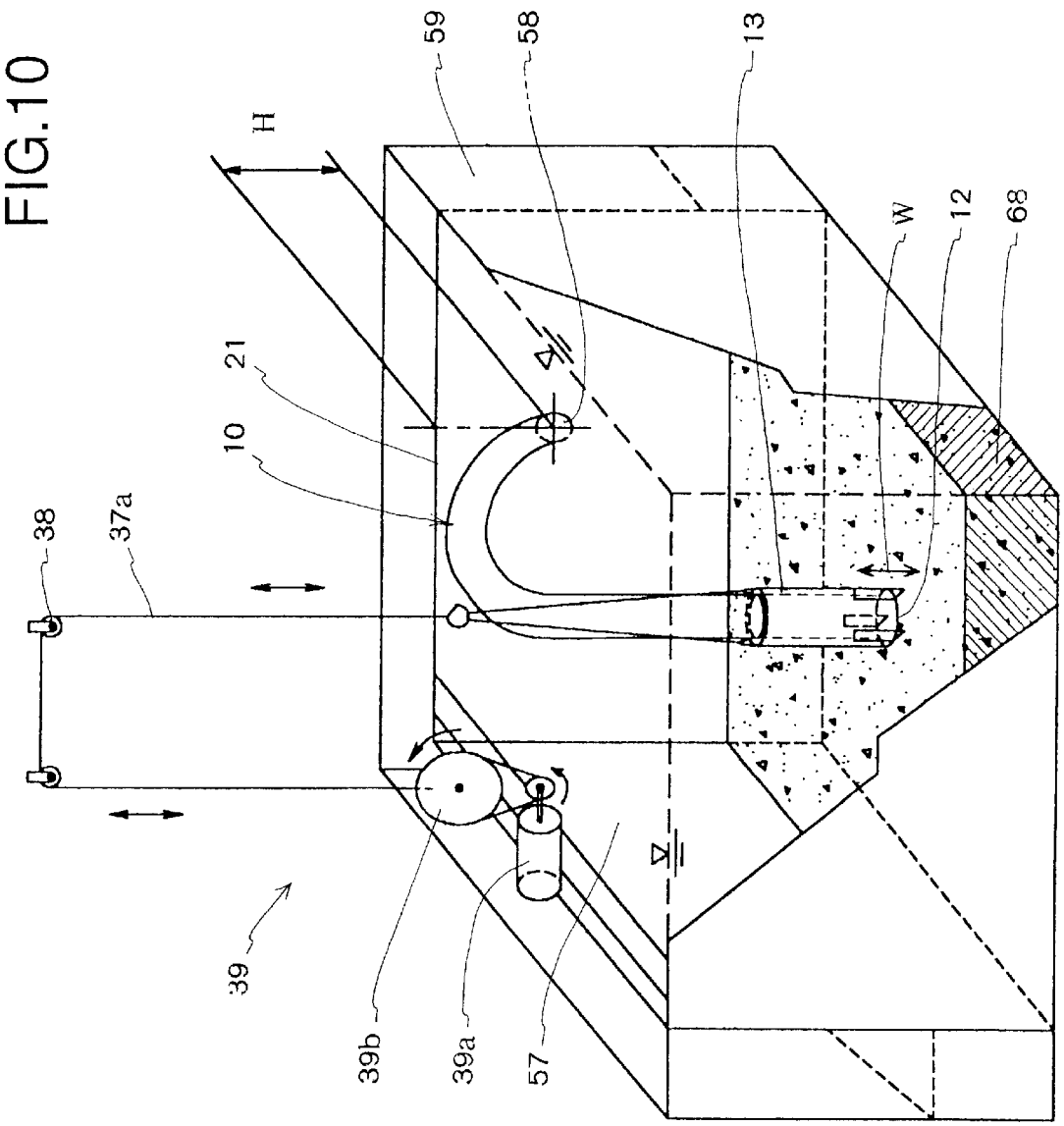
FIG. 10 is an explanation view of an experimental equipment.

In the present embodiment, the crane function is realized by a crane 37 and a vertical moving mechanism 39 (see FIG. 10). The crane 37 is mounted on the crane boat 36 and capable of lifting a part of the main tube part 14 above the water level 21. In the present embodiment, a part of the main tube part 14 near the bank hole 24 and the straight tube part 13 are usually submerged. Usually, the whole main tube part 14 is not lifted above the water level 21.

When the discharging work is stopped, the crane 37 lifts the part of the main tube part 14 above the water level 21 so as to introduce air in the tube and stop the siphonage. At that time, solids are forcibly discharged by weight of fluid, so that the tube is not closed.

The vertical moving mechanism 39 is capable of vertically moving the straight tube part 13 so as to properly flow water in the discharge tube.

Namely, the crane 37 and the vertical moving mechanism 39 make the crane function. As explained in the present embodiment, the crane 37 and the vertical moving mechanism 39 may be operated separately; the both 37 and 39 may be combined as one mechanism.

For example, the crane means may comprise an elevating section, which is connected to the straight tube part 13 and suspended by a wire of the crane 37, and the vertical moving mechanism, which vertically moves the elevating section by a proper mechanism, e.g., a cum mechanism. The whole straight tube part 13 may be moved in the vertical direction. An outer cylinder may cover an end part of the straight tube part 13 including the suction port 12, and the outer cylinder may be vertically moved with respect to the straight tube part 13. In the case of moving the part of the straight tube part 12, energy consumption can be reduced.

To vertically move the suction port 12, a bellows section capable of extending and contracting may be provided to the straight tube part 13.

Note that an example of the straight tube 13, and effects of vertical motion thereof, will be explained later.

A crank mechanism and a link mechanism may be employed as the vertical moving mechanism. An electric motor and a cylinder unit may be employed as a unit for driving the vertical moving mechanism.

To vertically move the main tube part 14, a bendable section is provide to the main tube part 14. The bendable section may be short and may be long by using a flexible tube. Considering inertia of the solids in the flow, the main tube part 14 may be formed like a clothoid curve and suspended. For example, as shown in FIG. 2, the bendable section of the main tube part 14 may be supported by a guide 37b formed like the clothoid curve. The bendable section, which is made of, for example, the flexible tube, is capable of freely horizontally moving the main tube part 14 according to change of positions of the suction port 12.

The discharge tube 10 is capable of moving in the bank hole 24, the bank hole is water-tightly sealed, and the whole main tube part 14 is capable of moving in the vertical direction.

As shown in FIGS. 6 and 7, the dam banking 25, through which the discharge tube 10 is pierced, may have a water gate structure designated by a law.

Figure 6A:
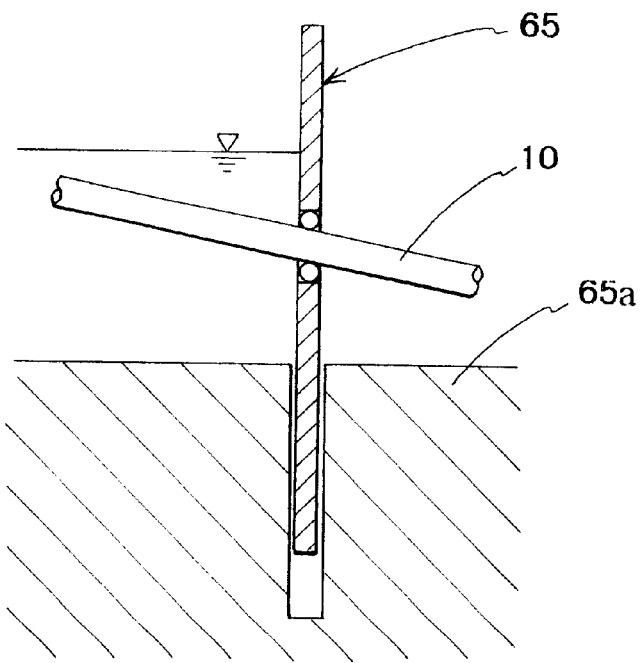
FIGS. 6A and 6B are sectional views of another example of a dam banking.
Figure 6B:
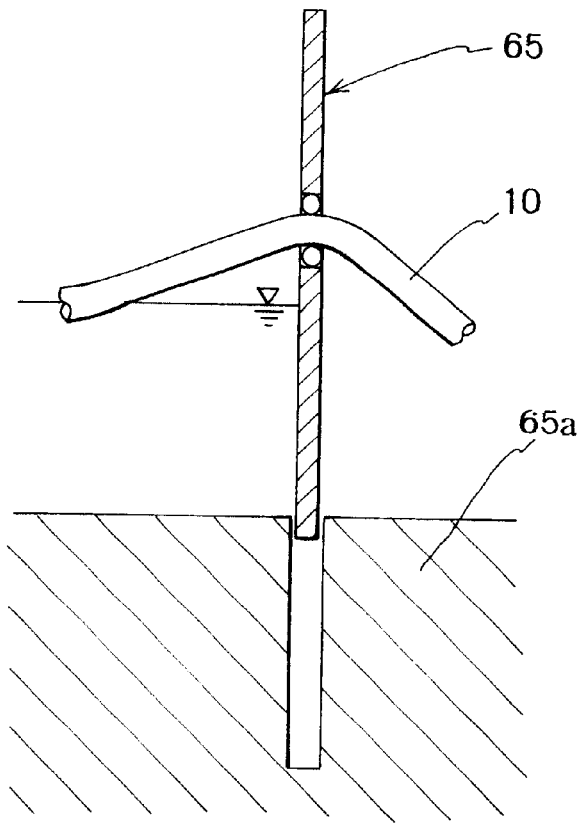

In an embodiment shown in FIGS. 6A and 6B, a dam banking 65 is capable of vertically sliding with respect to a base part 65a. In FIG. 6A, the discharge tube 10 is moved downward so as to discharge the muddy flow from the discharge tube 10. In FIG. 613, the discharge tube 10 is moved upward so as to easily stop the siphonage.

Figure 7A:
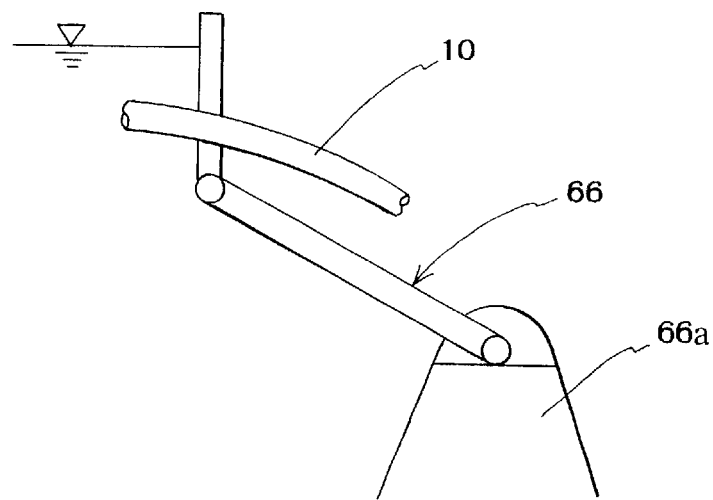
FIGS. 7A and 7B are also sectional views of another example of a dam banking.
Figure 7B:
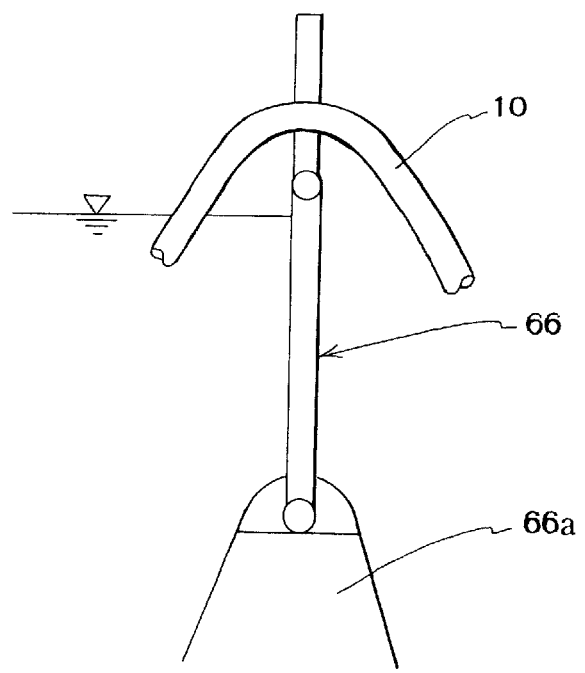

In an embodiment shown in FIGS. 7A and 6B, a dam banking 65 is capable of upwardly and downwardly turning with respect to a base part 66a. In FIG. 7A, the discharge tube 10 is moved downward so as to discharge the muddy flow from the discharge tube 10. In FIG. 7B, the discharge tube 10 is moved upward by the dam banking 66, which is extended upward, so as to easily stop the siphonage.

Further, the main tube part 14 can be bent at a mid part and turned in the horizontal plane, so that the deposits 22 in a broad area can be discharged.

In the deposit discharge system of the present embodiment, the main tube part 14 of the discharge tube 10 can be lifted by the crane 37 of the crane boat 36 and can be positioned above the bank hole 24, through which the discharge tube 10 is pierced, as the highest part of the discharge tube 10. With this action, the main tube part 14 can be inclined so as to flow the water including the deposits, by the gravity, without depositing solids in the discharge tube 10 and reducing speed of the flow. Especially, in the case of uniform inclination, the muddy water can be smoothly flowed. By smoothly flowing the muddy water, the discharge tube is not closed and the deposits 22 can be efficiently discharged. An air valve 40 opens and closes the main tube part 14 on the suction port side so as to generate and stop the siphonage. The air valve 40 is provided to a proper position, at which air and water vapor can enter and go out from the main tube part 14.

The siphonage is generated by the steps of: opening the air valve 40; submerging the main tube part 14 of the discharge tube 10 under the water level 21, by the crane 37 of the crane boat 36, so as to discharge air; and closing the air valve 40 after air is completely discharged. With this action, the air in the discharge tube 10 can be easily discharged, and the siphonage can be easily generated. In this case, the simple elements including the crane 37 and the air valve 40, and the simple action are capable of properly discharging the deposits without a special unit, e.g., a pump. Therefore, manufacturing cost and running cost of the system can be reduced.

Next, the water-tightly sealing structure between the bank hole 24 and the discharge tube 10 will be explained with reference to FIG. 3.

A mid part 17 of the discharge tube 17 is made straight so as to move the discharge tube 10 through the bank hole 24 in the longitudinal direction thereof. A plurality of roller-shaped supporting members 42 are provided near the bank hole 24 so as to smoothly move the discharge tube 10. Namely, a supporting section 45 including the roller-shaped supporting members 42, which are provided to a main body 44 of the dam banking 25 and which contact a bottom face of the discharge tube 10 and a sealing member 50. The supporting section 45 allows the discharge tube to smoothly move sideward.

In the present embodiment, the deposits in a broad area of the huge dam can be discharged without reducing discharging efficiency.

Note that inner spaces of the supplementary tunnels 32 are made broad, so as to freely move the discharge port 18 in the longitudinal direction and in the vertical direction with the movement of the main tube part 14.

The sealing members 50 are made of rubber and formed like air bags. The sealing members 50 are provided a space between an inner face of the bank hole 24 and an outer face of the discharge tube 10, and air is introduced so as to pressed onto the both faces. With this structure, the space between the bank hole 24 and the discharge tube 10 can be water-tightly sealed easily and securely. Further, the discharge tube 10 can be securely held. By discharging the air from the sealing members 50, the discharge tube 10 can be moved in the longitudinal direction. Since the discharge tube 10 is held by the soft sealing members 50, the discharge tube 10 can be slightly moved while sealing the space. Therefore, the discharge tube 10 can be moved up-and-down and right-and-left in the bank hole 24.

The bank hole 24 is formed by a water gate plate 52, and a groove section 53 (see FIG. 1) is formed in the dam banking 25. The water gate plate 52 is vertically moved, by driving force, so as to open and close the bank hole 24.

By moving the water gate plate 52 downward, the discharge tube 10 can be clamped, so that the discharge tube 10 can be fixed in the bank hole 24. By moving the water gate plate 52 upward, the discharge tube 10 can be moved.

In the present embodiment, the sealing members 50 are respectively provided to an upper part and a lower part of the bank hole 24 and expanded to use as plugs when the position of the suction port 12 is defined. With this structure, the discharge tube 10 can be properly fixed and the space can be properly water-tightly sealed.

The supporting section 45 may be provided above the highest water level so as to operate the water gate for adjusting the water level. In this case, the discharge tube 10 is routed over the dam banking 25, so the water channel is routed above the water level. To maintain the flow, an underwater pump is provided to a mid part of the tube, or an underwater discharging section or an air check valve is provided to the discharge port 18. Note that, the discharge tube 10 may be moved to the upper part of the dam banking 25, as shown in FIGS. 6 and 7, so as to actively stop the siphonage.

Successively, the action of the deposit discharge system of the present embodiment will be explained.

The air valve 40 introduces water and stops discharge operation by sucking air. While the discharge tube 10 is submerged, water flows in the tube by difference of water level and the tube can be easily filled with the water.

In the case that the muddy flow is discharged by using the siphonage generated within 4 m above the water level, the valve 18a of the discharge port 18 is closed, the water is introduced into the tube from the air valve 40 so as to discharge air therefrom, and the valve 18a of the discharge port 18 is fully opened two or three seconds after 90% of the tube 10 or more is filled with the water.

In the state that the discharge tube 10 is filled with the water and arranged below the hydraulic gradient, the suction port 12 is vertically vibrated or moved close to and away from the surface of the deposits 22 when speed of the flow reaches 3.8 m/sec. or more.

Preferably, the suction port 12 is moved close to and away from the bottom of the water when the speed of the flow maintains 3.8 m/sec. or more, so that the solid-liquid two-phase flow is generated and the deposits 22 can be discharged toward the downstream side.

The water is sucked by a negative pressure section, which is generated below the suction port 12 with environmental vorticity, while the suction port 12 is moved downward, and an ekman layer is formed. With this action, a radial in-flow is generated and a heavy up-flow is generated near a spiral point, so that solids can be sucked upward. Further, a ground effect accelerates a swirl, and vorticity is further added to the ekman layer. Therefore, the swirl is attracted to the ground, and the activated deposits 22 are involved therein and introduced into the discharge tube 10. At that time, the deposits 22 are separated from the water bottom, and the solid-liquid two-phase flow is generated. The speed of the muddy flow sucked by the suction port 12 should be 3.0 m/sec. or more, preferably 3.8 m/sec. or more at the suction port 12. If the straight tube part 13, through which the deposits 22 vertically rise, is vertically held under this condition, solids whose diameter is up to 70% of an inner diameter of the suction port 12 can be sucked and discharged.

By vertically moving the straight tube part 13 while sucking the deposits 22, the pulsated flow is generated in the straight tube part 13, so that a plug flow, in which the solid concentration is partially varied, is generated.

The pulsating flow generates vibrations, so that no solids are deposited in the discharge tube 10. Namely, energy of the vibrations smoothly conveys the deposits.

A Wash-effect is generated in the water with a low concentration of solid parts of the plug flow, so that no deposits are stuck and deposited in the discharge tube 10.

For clarification of "pulsating flow", "plug flow", and the relationship between pressure and density are described more fully below.

Explanation of "Pulsating Flow"

The straight tube port 13 of the discharge tube 10 is vertically moved upward and downward with a prescribed cycle so as to repeatedly move the suction port 12 close to and away from the water bottom face of the water storing place as shown in FIGS. 9A–D. When the suction port 12 contacts the water bottom face (FIG. 9C) the suction port 12 is closed, so that the water flow in the discharge tube is stopped. With this action, negative pressure is produced in the lower section of the suction port 12. On the other hand, when the suction port is upwardly moved and opened (FIG. 9D), water runs into the suction port 12, so that the pressure in the suction port is increased, and positive pressure is produced therein. Therefore, negative pressure parts and positive pressure parts are alternately produced in the discharge tube by repeatedly moving the suction port 12 upward and downward. Namely, vibrations are generated in the discharge tube. This water flow is called "pulsating flow". By generating the pulsating flow, depositing sands and stones in the discharge tube can be prevented. The energy of the vibrations serves as lubricant which smoothly flushes sands and stones.

Explanation of "Plug Flow"

Figure 8:
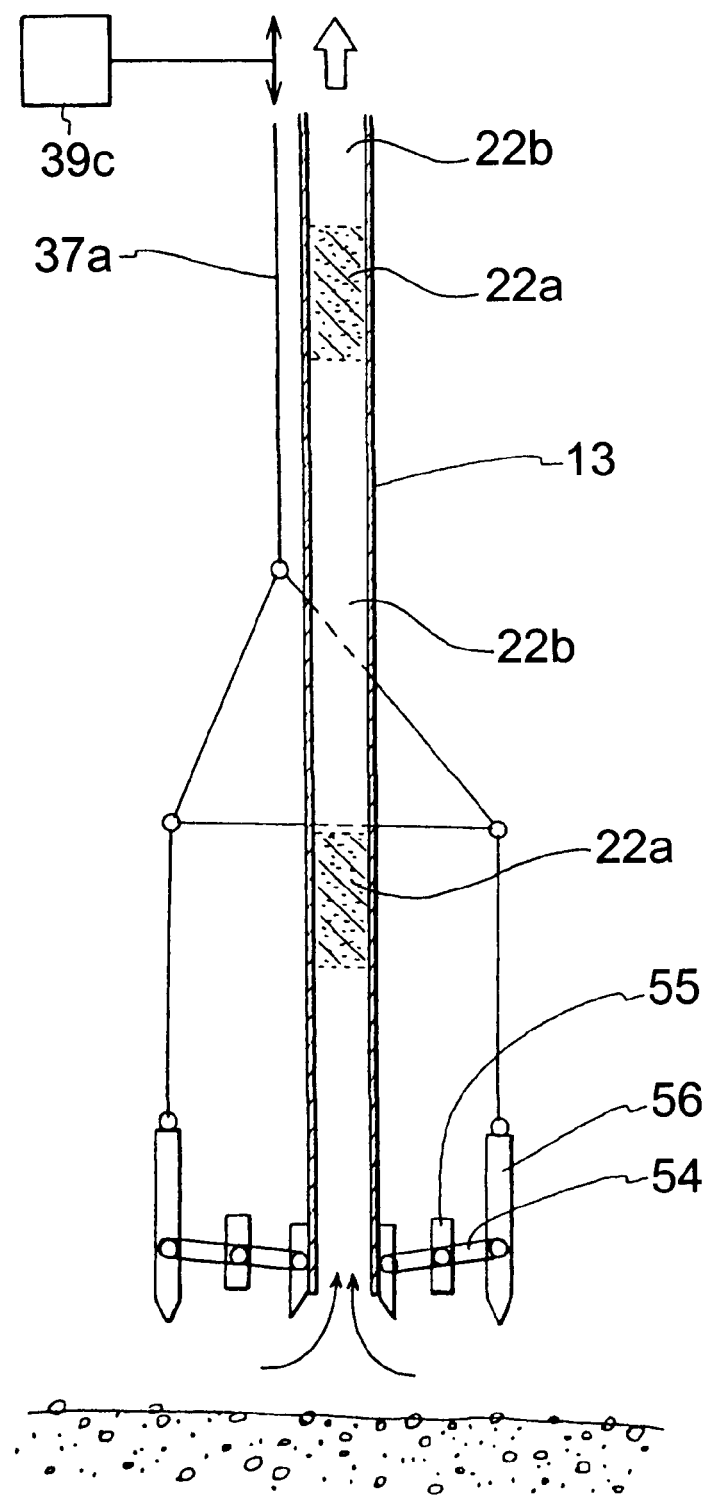
FIG. 8 is a side sectional view of a suction port.

As described above, the discharge tube 10 is vertically moved upward and downward with prescribed cycle so as to repeatedly move the suction port close to and away from the water bottom face of the water storing place. When the suction port contacts the water bottom face (FIG. 9C), the suction port 12 is closed, so that a high solid-concentrated part 22a, which is called a "plug", which includes much deposits (sands and stones), is sucked into the suction port 12. Namely, water and highly concentrated deposits run into the suction port 12 when the suction port 12 approaches to the water bottom face. On the other hand, when the suction port is moved upward, water separated from the water bottom face runs into suction port with lowly concentrated deposits. This part is a low solid-concentrated part 22b. By repeatedly moving the suction port upward and downward, the high solid-concentrated parts 22a (plugs) and the low solid-concentrated parts 22b are alternately appeared in the discharge tube (FIG. 8). In the present invention, these "plugs" 22a represent those parts of the pulsating which contain a high concentration of solid parts, which alternately appear between parts of the flow 22b with a low concentration of solid parts.

Explanation of the Relationship of Pressure/Density

In the present invention, the discharge tube is vertically moved in a prescribed cycle so as to move the suction port 12 close to and away from the bottom face of the water storing place. As to the water pressure, high pressure and low pressure alternately appear in the discharge tube, so it is the "pulsating flow"; as to the density of deposits, water with a high concentration of solid parts and water with a low concentration of solid parts alternately appear in the discharge tube, and are called the "plug flow".

By using the pulsating flow and the plug flow, the deposits can be properly sucked and conveyed, so that the deposition in the tube can be properly prevented. Namely, closing the discharge tube 10 can be prevented, and the solid-liquid two-phase flow can be efficiently discharged.

When the suction port 12 is moved downward and contacts the water bottom 29, a distance therebetween is made close, and the flow is braked. With this action, sucking force and the speed of the flow are inversely proportional to amount of sucking water reduced, so that they are increased and the deposits 22 are sucked. On the other hand, when the suction port 12 is moved upward and away from the water bottom 29, the amount of flow is recovered by the difference of water level, so that the deposits 22, which have been once sucked, are conveyed by the water flow in the discharge tube 10 and then discharged. With this action, the pulsating flow and the plug flow are generated, and the solid-liquid two-phase flow, including the deposits 22, can be properly discharged.

Since the vertical moving mechanism 39 has means 39c for adjusting up-down cycle of the straight tube part 13, generating the pulsating flow and the plug flow and the volume concentration of the solid-liquid two-phase flow can be easily adjusted. By the simple structure and operation, closing the tube can be prevented, and the solid-liquid two-phase flow can be efficiently discharged. For example, the cycle adjusting means 39c may be formed by a cum and a motor.

In FIG. 8, arm members 54, whose front ends are capable of turning upward and downward, are pivotably provided near the suction port 12, which is provided to the lower end of the straight tube part 13. A fulcrum member 55 is pivotably provided to a mid part of each arm member 54, and its vertical posture is always maintained in the water. A chisel 56, which agitates and activates the deposits in the dam, is pivotably provided to an end of each arm member 54, and its vertical posture is always maintained in the water. An elevating wire 37a is connected to the chisels 56. With this structure, the solid-liquid two-phase flow can be efficiently discharged.

Action of the chisels 56 will be explained with reference to FIGS. 9A–9D.

Figure 9A:
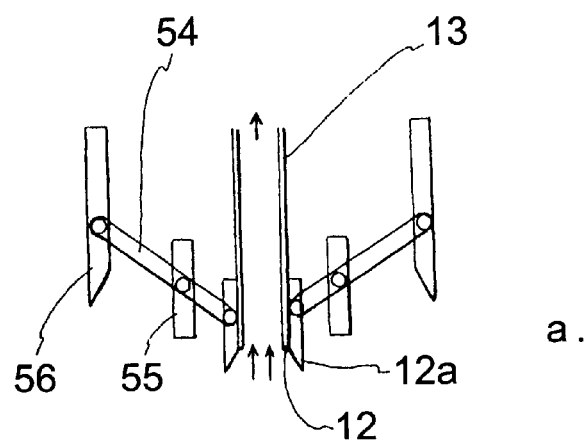
FIGS. 9A–9D are side sectional views showing action of the suction port shown in FIG. 8.

Firstly, as shown in FIG. 9A, the chisels 56 are lifted by the wire 37a and located at upper dead points, and the suction port 12 is stopped at a position whose level is "a".

Next, as shown in 9B, the chisels 56 are moved downward with a downward movement of the straight tube part 13, and the suction port 12 freely falls as shown by an arrow "b".

Figure 9B:
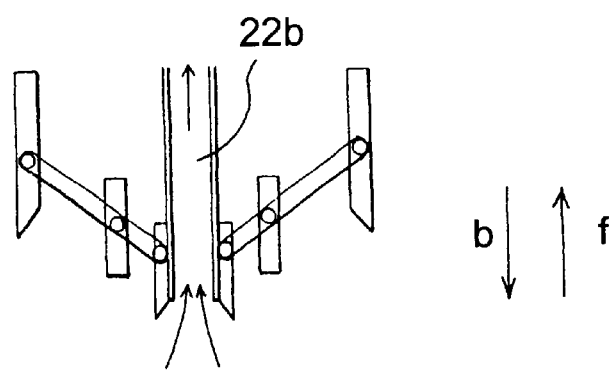
Figure 9C:
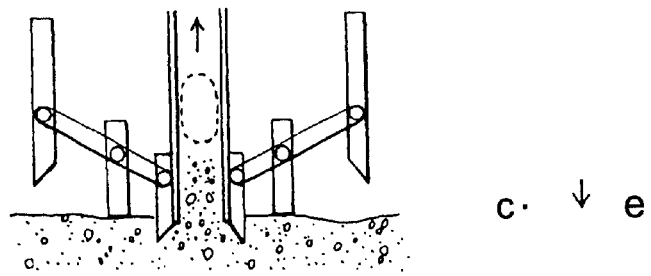
Figure 9D:
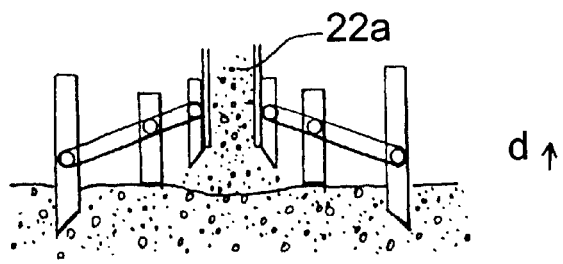

When the suction port 12 of the straight tube part 13 contacts the water bottom 29 as shown in FIG. 9C, the solid-liquid two-phase flow having high concentration is lifted by ground effect. At that time, the suction port 12 is located at the water bottom 29 whose level is "c". Next, as shown in FIG. 9D, the chisels 56 are pivoted about the fulcrum members 55 so as to strike the water bottom 29 and agitate the deposits. Namely, the deposits are mixed with the water. At that time, the suction port 12 is lifted in the direction shown by an arrow "d" by counterforce working to the chisels 56. By this shock, the pulsating flow can be properly generated.

When the chisels 56 are lifted, the state is returned to the state shown in FIG. 9C, and the suction port 12 of the straight tube part 13 strikes the water bottom 29 (an arrow "c"), then the solid-liquid twophase flow is lifted by the ground effect. When the suction port 12 recontacts the water bottom 29, the highly concentrated solid-liquid twophase flow, which is lifted when the suction port 12 firstly contacts the water bottom 29, is located at a position indicated by a dotted line in the straight tube part 13.

Further, in the state shown in FIG. 9B, the chisels 56 are lifted in the direction shown by an arrow "f", then returned to the upper dead points "a" shown in FIG. 9A.

By repeating above described action, the pulsating flow and the plug flow are properly generated, so that the solid-liquid two-phase flow can be highly efficiently discharged. If the vertical movement is executed with prescribed cycle, the water with a high concentration of solid parts 22a alternates at regular intervals with water with a low concentration of solid parts 22b of the solid-liquid two-phase flow as shown in FIG. 8. Therefore, the proper pulsating flow and the plug flow are generated, and the solid-liquid two-phase flow can be properly discharged.

Results of experiments will be explained with reference to FIGS. 10 and 11.

FIG. 10 shows a schematic view of an experimental equipment. The experimental equipment includes: a main water tank 57; a discharge tube 10 having a straight tube part 13; a suction port 12 opening to face a water bottom face; a discharge port 58 provided to a side wall of the main tank 57; a vertical moving mechanism 39; and a sand tank 59 storing sands and stones discharged. Depth of water to deposits 68, which were sands and stones, was about 3 m. Width of the water tank 57 was about 7 m; length thereof was about 5 m; height thereof was about 5 m; amount of stored water was about 150 m$^3$; volume of the deposits 68 was about 50 m$^3$.

In the experiment, level difference "H" between the water surface 21 and the discharge port 58 was 1.65 m; total length of the discharge tube 10 was 8 m; an inner diameter "D" of the tube was 0.15 m. Vertical stroke "W" of the straight tube part 13, which includes the chisels 56 shown in FIGS. 8 and 9, was 20 cm, and the straight tube part was vertically moved 30 times a minute. The straight tube part 13 was suspended by a wire 37a and pulleys 38, and the downward movement of the straight tube part 13 was free fall. The vertical moving mechanism includes a cum unit 39b driven by a motor 39a, so that speed of the downward movement was much lower than that of the upward movement.

The deposits 68 includes gravels, whose diameter were 50 mm or less, and volume percentage of gravels, whose diameter were 30 mm or less, was 50%. Since the speed of the downward movement of the straight tube part 13 was much lower than that of the upward movement thereof, turbulent flow in the straight tube part was highly activated. In a preparatory experiment, gravels, whose size (minor axis) was 70% of the inner diameter of the tube, can be smoothly sucked and discharged. Namely, gravels (elliptical rotatable gravels), whose size was 70% of the inner diameter of the tube having diameter of 200 mm and whose project area was 49% of the tube, were sucked and discharged. On the other hand, in the main experiment, gravels, whose size is ⅓ of the diameter, were included so as to fix experimental conditions.

The discharge tube 10 was vertically moved in the water so as not to go out of the water. In the main experiment, the whole straight tube part 13 including the suction port 12 was vertically moved. As shown in FIG. 10, a double cylinder structure was employed so as to attach claws and the chisels; but an outer cylinder is not vertically moved with respect to an inner cylinder.

With this structure, the pulsating flow and the plug flow were properly generated by the vertical movement of the suction port 12, and the ground effect could be properly used. As shown in FIG. 11, the discharging efficiency of the method of the present invention was 4.8 times as much as that of the conventional method.

Figure 11:
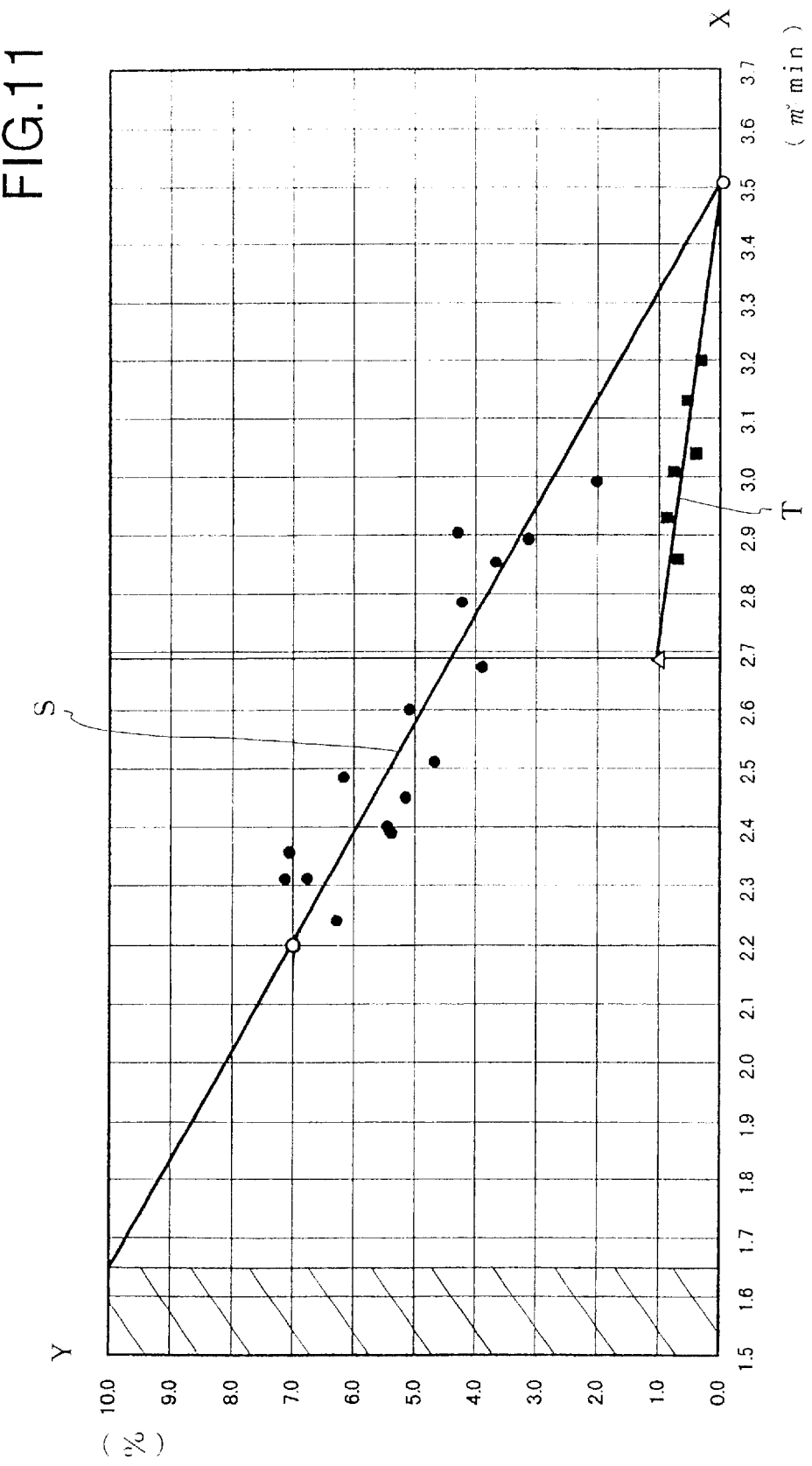
FIG. 11 is an explanation view of results of the experiments.
Figure 12:
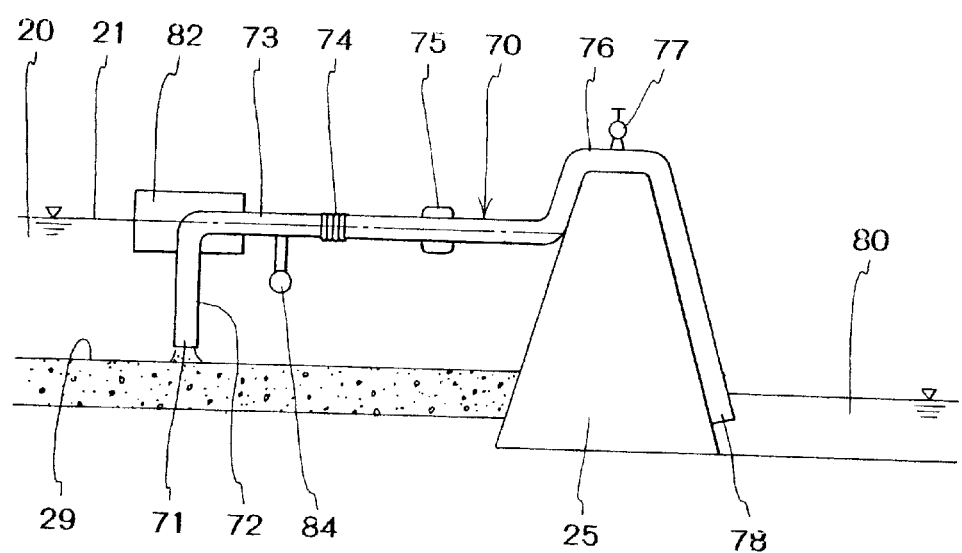
FIG. 12 is a sectional view of the conventional deposit discharge system.

FIG. 11 shows a relationship between solid concentration and average amount of flow of the plug flow to which the pulsating flow was added. The X-axis indicates the average amount of flow (unit: m³/min.); the Y-axis indicates the solid concentration (unit: %). Since the inner diameter of the tube was fixed, the average amount of flow was proportional to speed of discharge flow.

In the experiment, the level difference was fixed, so the average amount of flow was reduced when the solid concentration was risen. In FIG. 11, results of adding the pulsating flow by vertically moving the suction port 12 were shown by circular dots; results of discharging the solid-liquid two-phase flow, without moving the suction port 12, by the level difference only were shown by rectangular dots.

A graph "S", which indicates the state of adding the pulsating flow, and a graph "T", which indicates the state of using the level difference only, were gained according to the results. In the case of using the level difference only, discharge of the solid-liquid two-phase flow was stopped when the amount flow was 2.7 m³/min., so the graph "T" was ended. Namely, the highly concentrated solid-liquid two-phase flow could not be discharged, and the flow could not be maintained with small amount of flow.

On the other hand, in the case of adding the pulsating flow, the flow could be maintained with very small amount of flow, e.g., 2.25 m³/min., and the highly concentrated solid-liquid two-phase flow could be discharged. As clearly shown by inclination of the graphs, the discharging efficiency of the graph "S" was 4.5 times as much as that of the graph "T". Further, maximum range of maintaining the discharge flow was 5.6 times greater. Namely, high effects of the pulsating flow were proved.

In the above described experiment, the inner diameter of the tube was relatively short, i.e., 0.15 m, so the stroke of the vertical movement was 0.2 m. But the stroke of the actual system may be designed on the basis of installing conditions, etc. For example, if the inner diameter is made twice greater, the stroke may be made twice longer.

If steam was added toward the downstream, shock waves, which were generated when the steam bubbles were disappeared, give energy to fluid. Simultaneously, turbulent vortex was activated, and lifting force was increased. Further, sympathetic vibrations of an inner wall of the tube reduced friction loss in the tube.

A moving area of the suction port 12 depends on an install place, the inner diameter of the discharge tube 10; in the huge dam, the suction port may be moved in a direction "A", and its moving area may be 20–200 m from the bank hole 24. The suction port 12 can be moved in a horizontal plane by moving the crane boat 36. The suction port 12 can be vertically moved, in a direction "B", by the crane 37. For example, the suction port is vertically moved in a range of 3–100 m under the water surface.

The level difference between the bank hole 24 and a connecting section, which connects the discharge tube 10 with the crane 37, is adjusted by a float so as to arrange the tube with a fixed falling gradient. With this structure, the water including the deposits can be properly flown and discharged by gravity.

As described above, the discharge tube 10 can be moved, in the ban hole 24, in the longitudinal direction. Therefore, change of a distance between the ban hole 24, in which the discharge tube 10 is fixed, and the connecting section, which connects the discharge tube 10 with the crane 37, can be dealt by adjusting a distance between the fixed portion of the discharge tube 10 and the discharge port 18. The discharge tube 10 is easily moved to a proper position, at which the deposits 22 can be properly sucked, by the crane 37.

The total length of the discharge tube 10 is designed on the friction loss, so a standard total length for using at a dam is, for example, 200 m.

In the case of extending the discharge tube 10, a double tube structure, in which an inner tube can be slid so as to adjust the length, may be employed.

Figure 4:
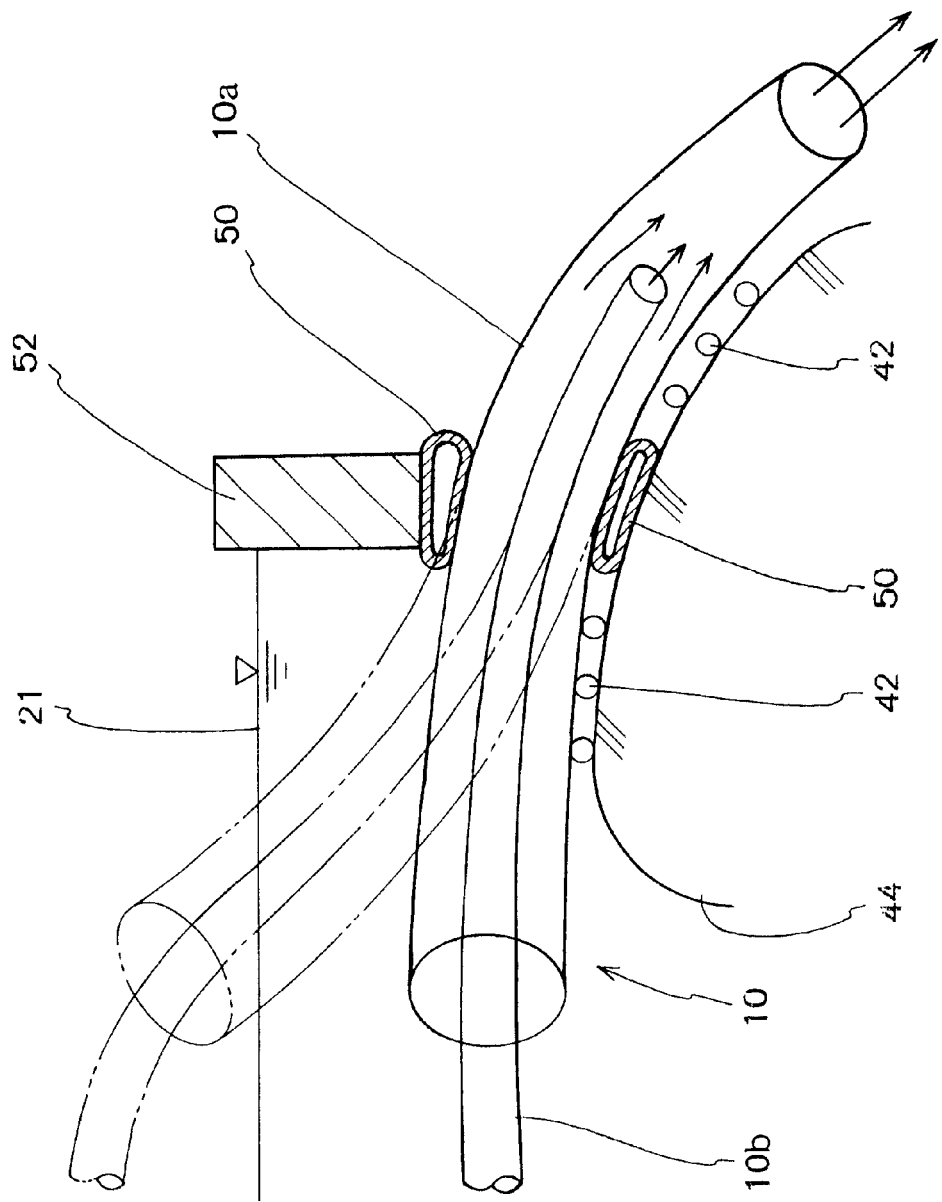
FIG. 4 is a sectional view of another embodiment of the deposit discharge system.

In the case of the discharge tube 10 shown in FIG. 4, which has the slidable inner tube, an inner diameter of an outer tube 10a may be twice as long as that of the inner tube lob, and only the water may be sucked by the outer tube. In this case, solid concentration of the solid-liquid two-phase flow can be reduced at a junction of the two flows, so that the flow can be easily flowed. Namely, the water in the inner tube lob is drawn by joining with the water in the outer tube 10a as shown by arrows, so that energy of the flow is made greater.

If amount of flowing water through the outer tube 10a is three times as much as that through the inner tube 10b or more, or speed of flowing water through the outer tube 10a is 2.1 m/sec. or more faster than that through the inner tube, proper drawing force can be generated at the junction. The solid concentration after confluence can be made ¼ or less, so bad influence to environment can be reduced.

If the speed of flowing water through the outer tube 10a is 3.0 m/sec. or more, turbulent vortex holds the inner tube lob at a center of the outer tube 10a, and the inner tube lob can be easily moved.

In the embodiment shown in FIG. 4, if an opening of the outer tube 10a on the upperstream side is lifted above the water level 21 as shown by two-dot chain lines, the water flow in the discharge tube 10 can be stopped.

As described above, the suction port 12 of the outer tube is vertically moved, in the direction "C", by the vertical moving mechanism 39 of the crane boat 36 so as to move close to and away from the water bottom face 29. With this action, the pulsating plug flow can be properly generated, so that suction force can be improved and the deposits can be highly efficiently discharged. By using the crane 37, no complex structure is required, further, as described above, the mechanism, which generates up-down motion only, may be used.

When flowing the solid-liquid two-phase flow is stopped, a bent section of the discharge tube 10 is lifted above the water surface, and air is introduced via the air valve 40, so that the siphonage is stopped.

Claws or lattice may be provided to the suction port 12 so as to prevent solids, whose size (minor axis) is greater than 70% of the inner diameter of the discharge tube 10, from entering, so that the tube is not closed by solids. The claws 12a (see FIG. 9) are capable of agitating the deposits and generating turbulent flow.

The discharge tube 10 may have a pivotable joint section, which is capable of preventing partial abrasion of the discharge tube 10. A rubber joint may be provided to the discharge tube 10 so as to make a flexible structure. If the discharge tube 10 is made of a metal, abrasion caused by the deposits can be prevented.

In the above described embodiments, the system is applied to the huge dam, but the system may be applied to a small dam, natural ponds and lakes, too.

Effects of the pulsating flow, the plug flow and the ground effect, which are generated by vertically moving the straight tube part 13 and moving the suction port 12 close to and away from the wager bottom face, have no relation to the position of the discharge tube 10. Therefore, even if the discharge tube 10 is routed above the water level 21 or routed, for example, above the dam banking, the solid-liquid two-phase flow can be efficiently discharged.

Preferred embodiments of the present invention have been described above, the present invention is not limited to the embodiments, it can be modified without departing the spirit of the invention.

What is claimed is:

1. A method of discharging deposits in a deposit discharge system including a discharge tube having a suction port opened so as to face a bottom face of water in a water storing place on which deposits are deposited, a straight tube part vertically extending upward from the suction port, and a discharge port opening in a water path on a downstream side of the water storing place for draining the deposits from the water storing place to the water path together with water stream, the method comprising the steps of:

piercing the discharge tube through a bank hole, which is located below a top surface of the water of the water storing place;

suspending the discharge tube by a boat, which floats on the top surface of the water, so as to locate the discharge tube under the top surface of the water of the water storing place; and repeatedly lifting the discharge tube to a prescribed level and freely dropping the discharge tube by an elevating unit disposed on a boat, so as to repeatedly move the suction port close to and away from the water bottom face of the water storing place in a prescribed cycle, whereby a pulsating flow is generated in the discharge tube for discharging the deposits, the pulsating flow having negative pressure parts, which are produced by sucking low pressure water with a high concentration of the deposits through the suction port when the suction port contacts the water bottom face of the water storing place and the suction port is closed, and the pulsating flow also having positive pressure parts, which are generated by sucking high pressure water with a low concentration of the deposits when the suction port is lifted above the water bottom face of the water storing place and the suction port is opened, the water with the high concentration of the deposits being plugs, the plugs and the water with the low concentration of the deposits alternately appearing, thus forming the pulsating flow in the discharge tube.

2. The method according to claim 1, wherein the elevating unit of the boat suspends the discharge tube in a state such that a section of a main part of the discharge tube directly above the straight tube part extending vertically upward from the suction port is located at a position that is higher than the bank hole, the main part of the discharge tube having a down gradient from the position above the straight tube part to the bank hole, so that the deposits do not stay in the tube.

3. The method according to claim 1, wherein the boat suspends and locates the discharge tube under a hydraulic gradient line.

4. The method according to claim 1, further comprising the step of providing an air valve, which is capable of introducing air to and discharging the air from the discharge tube, to the discharge tube for generating and stopping siphonage caused by a waterhead difference.

5. The method according to claim 1, wherein the elevating unit includes means for adjusting the prescribed cycle of vertically moving the suction port.

6. The method according to claim 1, further comprising the steps of:

pivotably connecting one end of an arm member to an end of the straight tube part near the suction port, wherein another end of the arm member is capable of turning upward and downward;

pivotably connecting a fulcrum member to a mid part of the arm member, the fulcrum member being capable of pivoting with respect to the arm member while maintaining a vertical posture in the vertical direction in the water; and pivotably connecting a chisel to an opposite end of the arm member, the chisel being capable of maintaining a vertical posture in the water, and the deposits on the bottom face of the water, wherein a power transmitting member of the elevating unit is connected to the chisel.

7. The method according to claim 1, wherein a mid part of the discharge tube other than the vertical tube part is capable of bending in a horizontal plane.

8. The method according to claim 1, wherein a straight part of the discharged tube pierces through the bank hole formed in a dam banking and is capable of moving, in the bank hole in the dam banking, in a longitudinal direction thereof, and a plurality of roller-shaped supporting members, which assist smooth movement of the discharge tube, is provided near the bank hole in the dam banking.

9. The method according to claim 1, wherein a space between the bank hole and the discharge tube is watertightly sealed by a sealing member, the sealing member being formed as an air bag and being capable of compressing when air is introduced therein.

* * * * *